(12) United States Patent
Miyata et al.

(10) Patent No.: US 6,944,525 B2
(45) Date of Patent: Sep. 13, 2005

(54) APPARATUS AND METHOD FOR CONTROLLING AN AIRBAG DEPLOYMENT

(75) Inventors: Yujiro Miyata, Toyota (JP); Tomoki Nagao, Nagoya (JP); Imai Katsuji, Nagoya (JP); Motomi Iyoda, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 146 days.

(21) Appl. No.: 10/343,127
(22) PCT Filed: Aug. 16, 2001
(86) PCT No.: PCT/IB01/01465
§ 371 (c)(1), (2), (4) Date: Jan. 28, 2003
(87) PCT Pub. No.: WO02/16170
PCT Pub. Date: Feb. 28, 2002

(65) Prior Publication Data
US 2003/0132622 A1 Jul. 17, 2003

(30) Foreign Application Priority Data
Aug. 23, 2000 (JP) ........................ 2000-253028

(51) Int. Cl.$^7$ .............................................. B60R 21/01
(52) U.S. Cl. ............................ 701/45; 701/46; 701/47; 280/735
(58) Field of Search ............................ 701/45, 46, 47; 280/734, 735

(56) References Cited

U.S. PATENT DOCUMENTS

| 5,461,566 | A | | 10/1995 | Musser .................. 364/424.05 |
|---|---|---|---|---|
| 6,036,225 | A | * | 3/2000 | Foo et al. .................. 280/735 |
| 6,170,864 | B1 | * | 1/2001 | Fujita et al. ................. 280/735 |
| 6,196,578 | B1 | * | 3/2001 | Iyoda ......................... 280/735 |
| 6,327,527 | B1 | * | 12/2001 | Imai et al. .................... 701/45 |
| 6,636,794 | B2 | * | 10/2003 | Yamashita ................... 701/46 |

FOREIGN PATENT DOCUMENTS

| EP | 0 693 404 | | 4/1999 |
|---|---|---|---|
| EP | 1 028 039 | | 8/2000 |
| JP | 10-152014 | | 11/1996 |
| JP | 11-286257 | | 4/1998 |
| JP | 3063731 | * | 10/1999 |
| WO | WO97/48582 | | 12/1997 |

* cited by examiner

Primary Examiner—Tan Q. Nguyen
(74) Attorney, Agent, or Firm—Kenyon & Kenyon

(57) ABSTRACT

Satellite sensors (16, 18) that output level signals corresponding to an impact on a vehicle (10) are provided right and left portions of a forward portion of the vehicle (10), separately from a floor sensor (14). If a map (Lo1, Lo2, Lo3, Hi) selected as a threshold changing pattern from an impact (deceleration) detected based on the output signal of one of the satellite sensors (16, 18) and a map (Lo1, Lo2, Lo3, Hi) selected as a threshold changing pattern from an impact (deceleration) detected based on the output signal of the other satellite sensor are different from each other, the map of a smaller threshold is selected from the maps based on the output signals of the two satellite sensors (16, 18), and is set as a threshold changing pattern for determining whether to activate an airbag apparatus (30).

8 Claims, 5 Drawing Sheets

FIG. 5

| LEFT SATELLITE SENSOR \ RIGHT SATELLITE SENSOR | Hi | Lo3 | Lo2 | Lo1 | FAILSAFE |
|---|---|---|---|---|---|
| Hi | Hi | Lo3 | Lo2 | Lo1 | FAILSAFE |
| Lo3 | Lo3 | Lo3 | Lo2 | Lo1 | Lo3 |
| Lo2 | Lo2 | Lo2 | Lo2 | Lo1 | Lo2 |
| Lo1 | Lo1 | Lo1 | Lo1 | Lo1 | Lo1 |
| FAILSAFE | FAILSAFE | FAILSAFE | Lo3 | Lo2 | Lo1 | FAILSAFE |

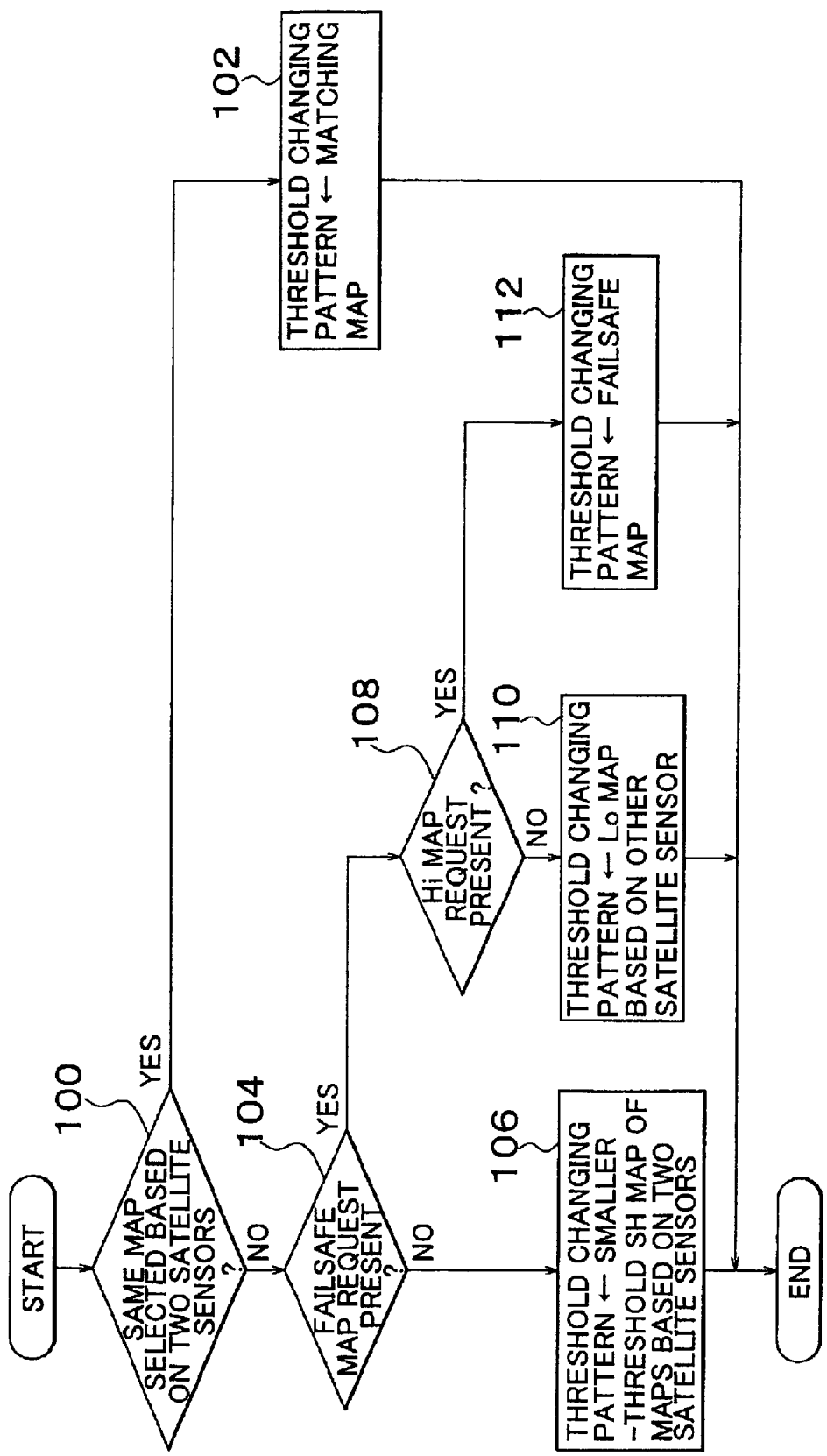

APPARATUS AND METHOD FOR CONTROLLING AN AIRBAG DEPLOYMENT

INCORPORATION BY REFERENCE

The disclosure of Japanese Patent Application No. 2000-253028 filed on Aug. 23, 2000, including the specification, drawings and abstract is incorporated herein by reference in its entirety.

BACKGROUND OF THE INVENTION

1. Field of the Invention

The invention relates to an activation control apparatus and an activation control method thereof to be used to control the activation of an airbag apparatus and, more particularly, to an airbag apparatus activation control apparatus that is suitable in properly activating an airbag apparatus for protecting an occupant at the time of a collision of a vehicle.

2. Description of the Related Art

An activation control apparatus of an airbag apparatus is conventionally known as disclosed in, for example, Japanese Patent Application Laid-Open No. 11-286257, which has a floor sensor that is disposed on a floor tunnel of a vehicle body and that outputs a signal corresponding to the impact that occurs on the floor tunnel, and which deploys an airbag when the value of a parameter based on the output signal of the floor sensor exceeds a threshold. This apparatus further has a satellite sensor that is disposed in a forward portion of the vehicle body and that outputs a signal corresponding to the impact received by the forward portion of the vehicle body. The apparatus increases the amount of reduction of the aforementioned threshold with increases in the impact received by the forward portion of the vehicle body that is detected based on the output signal of the satellite sensor. Therefore, the airbag deploys more easily if the impact that occurs on the forward portion of the vehicle body is greater. Thus, according to the above-described conventional apparatus, the airbag apparatus for protecting an occupant can be appropriately activated.

In the case of an offset collision or the like, the impacts received by right and left forward portions of the vehicle body are greatly different from each other. In the aforementioned conventional apparatus, satellite sensors are provided in right and left forward portions of the vehicle body. Therefore, if a vehicle having an arrangement as described above undergoes an offset collision, the satellite sensors output signals different from each other. Therefore, in a construction having a plurality of satellite sensors as described above, there is a need to process different signals outputted from different satellite sensors.

SUMMARY OF THE INVENTION

The invention has been accomplished in view of the aforementioned considerations. It is an object of the invention to provide an airbag apparatus activation control apparatus and an airbag activation control method capable of setting a threshold for activation of an airbag apparatus to a proper value if different output signals are received from a plurality of sensors disposed in various portions of a vehicle.

The aforementioned object may be achieved, for example, by an airbag apparatus activation control apparatus comprising a first sensor that is disposed at a predetermined position in a vehicle and that outputs a signal corresponding to an impact that occurs on the vehicle, and activation control means for activating an airbag apparatus if a parameter value f(Gf) based on the signal outputted by the first sensor exceeds a predetermined threshold (SH), a plurality of second sensors each of which is disposed at a position in the vehicle that is different from a position of the first sensor and each of which outputs a signal corresponding to an impact that occurs on a site in the vehicle related to the sensor; wherein the airbag apparatus activation control apparatus further comprises threshold changing means for changing the predetermined threshold (SH) in accordance with signals outputted by the plurality of said second sensors on the basis of a threshold reduction map.

The aforementioned object may further be achieved, for example, by an airbag apparatus activation control method for activating an airbag apparatus if a parameter value f(Gf) based on a signal corresponding to an impact that occurs on a vehicle exceeds a predetermined threshold (SH), wherein the method comprises the steps of: setting a threshold (SH); detecting an impact that occurs on the vehicle via a first sensor, and setting a parameter value f(Gf) based on a signal outputted by the first sensor in accordance with the impact; detecting an impact that occurs on the vehicle via a plurality of second sensors that are disposed at positions in the vehicle different from a position of the first sensor, and changing the predetermined threshold (SH) in accordance with signals outputted by the plurality of said second sensors on the basis of a threshold reduction map; and activating the airbag apparatus if the parameter value f(Gf) exceeds the threshold (SH).

According to a further aspect of the invention, the threshold (SH) is changed in accordance with a signal that indicates a greatest impact among signals outputted by the plurality of said second sensors.

According to a further aspect of the invention, if at least one of the plurality of second sensors has a failure, the threshold (SH) is changed in accordance with the signal outputted by at least one second sensor that does not have a failure.

According to a still further aspect of the invention, a failsafe predetermined value is set, if at least one of the plurality of second sensors has a failure, and the predetermined threshold (SH) is set to the failsafe predetermined value when the predetermined threshold (SH) based on the signal from the at least one second sensor that does not have a failure is greater than the failsafe predetermined value.

According to a further aspect of the invention, a value outputted by the second sensors is a deceleration of the vehicle or a value obtained by integrating the deceleration with respect to a unit time.

According to a further aspect of the invention, the plurality of second sensors are disposed forward of the first sensor within the vehicle.

BRIEF DESCRIPTION OF THE DRAWINGS

The above and other objects, features, advantages, and technical and industrial significance of this invention will be better understood by reading the following detailed description of exemplary embodiments of the invention, when considered in connection with the accompanying drawings, in which:

FIG. 5 is a map for setting a threshold changing pattern for activation of the airbag apparatus based on a relationship between the threshold changing patterns that are to be set based on the output signals of two satellite sensors; and FIG. 6 is a flowchart illustrating a control routine executed in this embodiment.

DETAILED DESCRIPTION OF PREFERRED EMBODIMENTS

In the following description and the accompanying drawings, the present invention will be described in more detail in terms of preferred embodiments.

Figure 1:
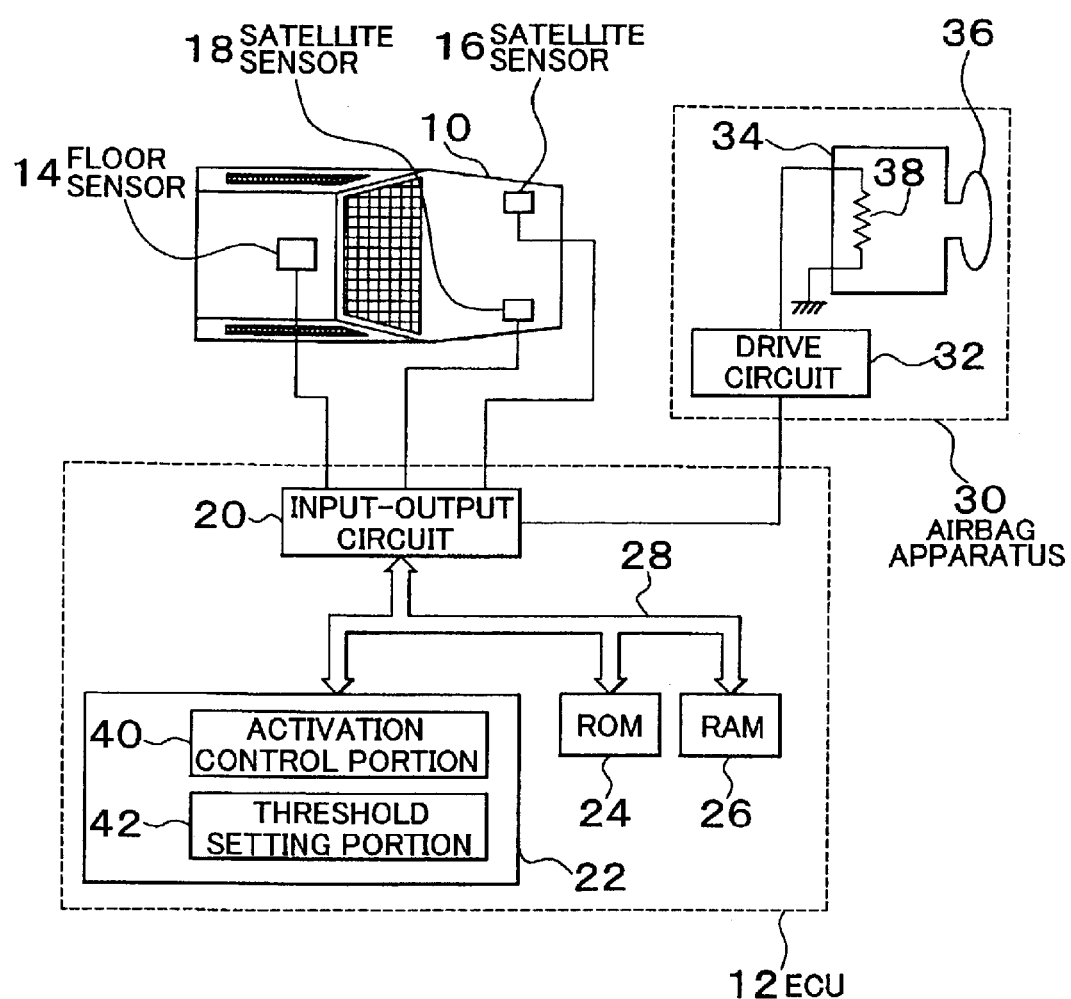
FIG. 1 is a diagram illustrating a system construction of a input-output circuit 20 of an activation control apparatus of an airbag apparatus in accordance with an embodiment of the invention.

FIG. 1 is a diagram illustrating a system construction of an activation control apparatus of an airbag apparatus in accordance with an embodiment of the invention. A system in this embodiment includes an electronic control unit (hereinafter, referred to as "ECU") 12 installed in a vehicle 10, and is controlled by the ECU 12.

The system of this embodiment includes a floor sensor 14 disposed near a floor tunnel extending in a central portion of a vehicle body, and satellite sensors 16, 18 disposed in left and right side members disposed in a forward portion of the vehicle body. Each of the floor sensor 14 and the satellite sensors 16, 18 is an electronic deceleration sensor that outputs a signal corresponding to the magnitude impact that occurs on the site where the sensor is disposed and, more specifically, a signal corresponding to the magnitude of deceleration in a fore-aft direction of the vehicle (hereinafter, referred to as "level signal"). Furthermore, each of the floor sensor 14 and the satellite sensors 16, 18 has a self-diagnostic function, and outputs a signal that indicates whether the sensor functions normally or has a failure (hereinafter, referred to as "normality/failure discrimination signal) together with the level signal to the outside at every predetermined period.

The ECU 12 is formed by an input-output circuit 20, a central processing unit (hereinafter, referred to as "CPU") 22, a read-only memory (hereinafter, referred to as "ROM") 24 in which processing programs and tables needed for calculations are pre-stored, a random access memory (hereinafter, referred to as "RAM") 26 for use as work areas, and a bidirectional bus 28 that connects these component elements.

The floor sensor 14 and the satellite sensors 16, 18 are connected to the input-output circuit 20 of the ECU 12. The output signals of the floor sensor 14 and the satellite sensors 16, 18 are separately supplied to the input-output circuit 20, and are suitably stored in the RAM in accordance with instructions from the CPU 22. The ECU 12 detects the magnitude Gf of deceleration that occurs on a central portion of the vehicle body based on the output signal of the floor sensor 14, and also detects the magnitudes $G_{SL}$, $G_{SR}$ of deceleration that occur on left and right forward portions of the vehicle body based on the output signals of the satellite sensors 16, 18. The ECU 12 determines whether any one of the sensors has a failure based on the normality/failure discrimination signal outputted from each sensor in accordance with a result of self-diagnosis.

The system of this embodiment further includes an airbag apparatus 30 that is installed in the vehicle 10 and that is operated so as to protect an occupant. The airbag apparatus 30 has a drive circuit 32, an inflator 34, and an airbag 36. The inflator 34 contains therein an igniter device 38 connected to the drive circuit 32, and a gas-producing agent (not shown) that produces a large amount of gas by using heat generated by the igniter device 38. The airbag 36 is inflated and deployed by the gas produced. The airbag 36 is disposed at a position such that when inflated and deployed, the airbag 36 comes into a space between an occupant in the vehicle 10 and component parts installed in the vehicle.

The drive circuit 32 of the airbag apparatus 30 is connected to the input-output circuit 20 of the ECU 12. The airbag apparatus 30 is activated to deploy the airbag 36 when a drive signal is supplied to the drive circuit 32 from the input-output circuit 20. The CPU 22 of the ECU 12 has an activation control portion 40 and a threshold setting portion 42. The activation control portion 40 of the CPU 22 calculates a predetermined parameter based on the deceleration Gf detected through the use of the output signal of the floor sensor 14 as described below in accordance with a processing program stored in the ROM 24, and determines whether the value of the parameter calculated exceeds a predetermined threshold SH. Furthermore, the activation control portion 40 controls the supply of the drive signal from the input-output circuit 20 to the drive circuit 32 of the airbag apparatus 30 based on a result of the determination. The threshold setting portion 42 appropriately sets the predetermined threshold SH for use in the activation control portion 40 based on the decelerations $G_{SL}$, $G_{SR}$ detected based on the output signals of the satellite sensors 16, 18.

Figure 2:
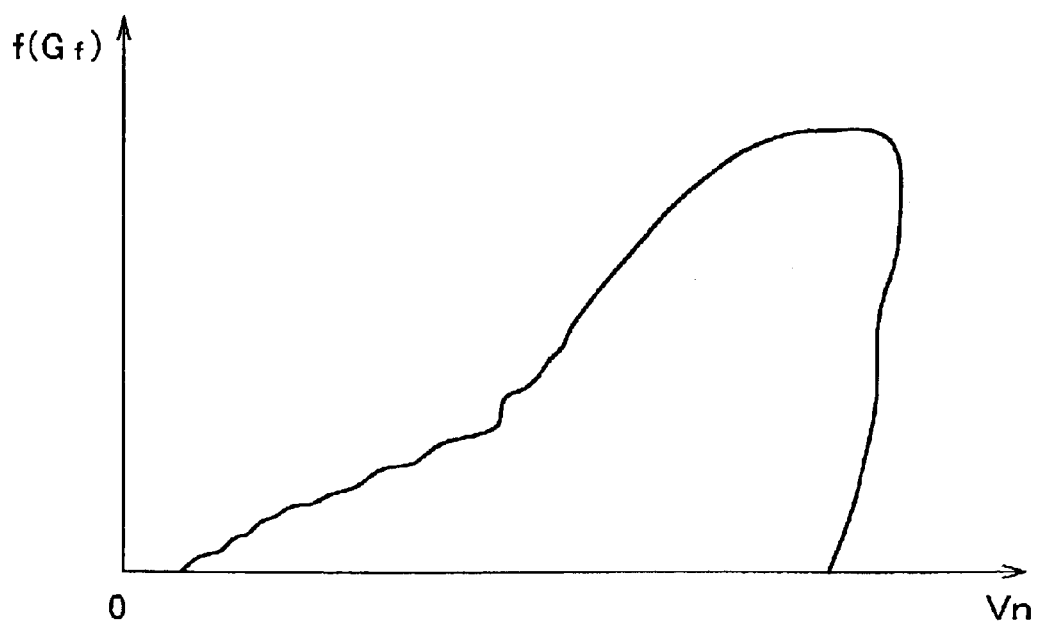
FIG. 2 is a diagram in which a relationship between the calculated value f(Gf) and the speed Vn under a predetermined circumstance is plotted at every predetermined time.

Next described will be a content of processing executed by the CPU 22 in this embodiment. In this embodiment, the activation control portion 40 determines a calculated value f(Gf) and a speed Vn through predetermined calculation with the deceleration Gf detected based on the output signal of the floor sensor 14. More specifically, the speed Vn is a value obtained by time integration of the deceleration Gf. That is, if a deceleration Gf is applied to the vehicle 10 while the vehicle 10 is running, a mass in the vehicle (e.g., an occupant) accelerates forward relative to the vehicle 10 due to inertia. In such a case, therefore, the speed Vn of the mass present in the vehicle relative to the vehicle 10 can be determined through time integration of the deceleration Gf. The calculated value f(Gf) may be the deceleration Gf itself, or may also be a value obtained through time integration of the deceleration Gf with respect to unit time. FIG. 2 shows a diagram in which a relationship between the calculated value f(Gf) and the speed Vn under a predetermined circumstance is plotted at every predetermined time. After determining the calculated value f(Gf) and the speed Vn, the activation control portion 40 compares the magnitude of a value determined from the relationship between the calculated value f(Gf) and the speed Vn as indicated in FIG. 2 with the magnitude of the threshold SH, which has been set as a determination map by the threshold setting portion 42.

Figure 3:
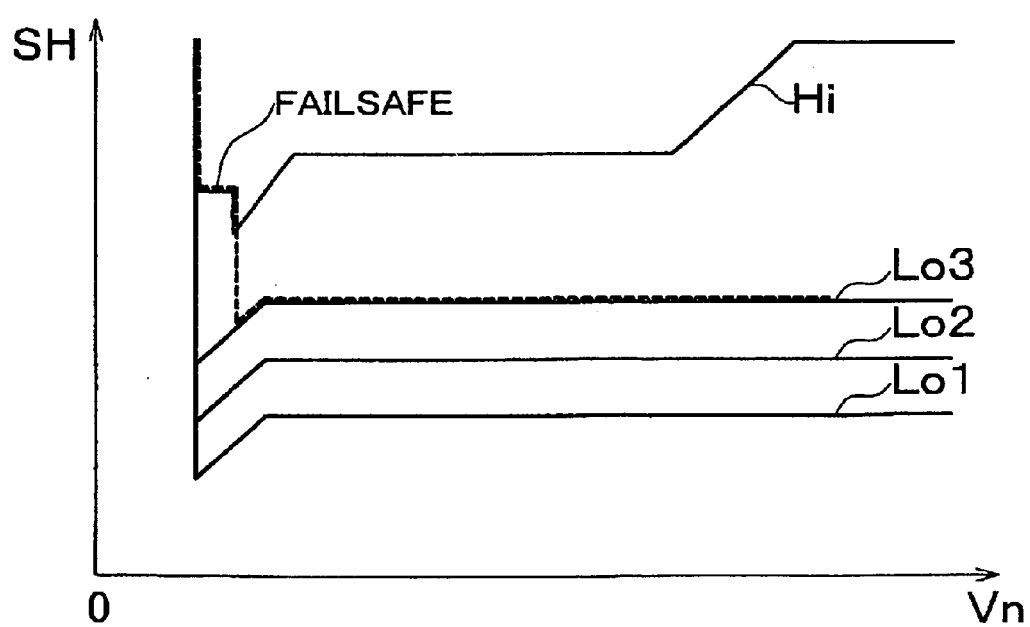
FIG. 3 is a diagram indicating changing patterns of a threshold SH that functions as a determination map for the relationship between the calculated value f(Gf) and the speed Vn in this embodiment.
Figure 4:
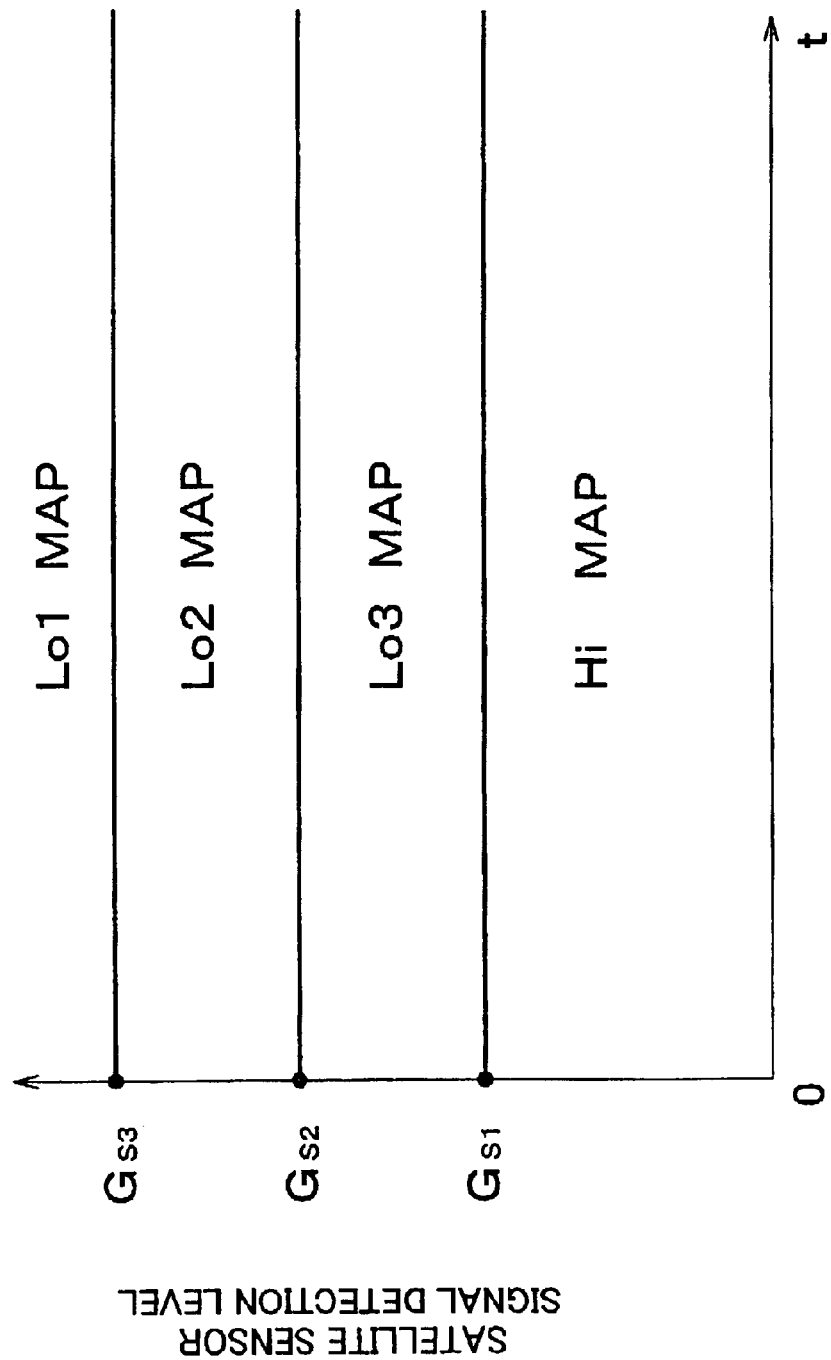
FIG. 4 is a diagram for illustrating a technique for setting a changing pattern of the threshold SH in this embodiment.

FIG. 3 shows a diagram indicating changing patterns of the threshold SH (hereinafter, referred to as "threshold changing patterns") that functions as a determination map for the relationship between the calculated value f(Gf) and the speed Vn in this embodiment. FIG. 3 indicates five threshold changing patterns, that is, a Hi map, a Lo3 map, a Lo2 map, a Lo1 map, and a failsafe map. In this embodiment, the Hi map is a map that serves as a reference, and the failsafe map partially overlaps the Lo3 map. FIG. 4 shows a diagram for illustrating a technique for setting a threshold changing pattern in this embodiment.

In this embodiment, the threshold setting portion 42 stores threshold changing patterns with regard to the relationship between the calculated value f(Gf) and the speed Vn that are empirically determined beforehand as indicated in FIG. 3. These threshold changing patterns are set on boundaries between a case where the airbag apparatus 30 needs to be activated upon an impact on the vehicle 10 and a case where there is no such need on the basis of the decelerations $G_{SL}$, $G_{SR}$ based on the output signals of the satellite sensors 16, 18.

That is, if the impact given to a forward portion of the vehicle body is greater, the possibility of collision of the vehicle 10 is higher, so that it is appropriate to change threshold changing patterns so that the airbag apparatus 30 is more prone to be activated. In this embodiment, therefore, the threshold setting portion 42 selects and sets a threshold changing pattern in such a fashion that the threshold SH is reduced if the decelerations $G_{SL}$, $G_{SR}$ detected based on the output signals of the satellite sensors 16, 18 are greater. More specifically, if the decelerations $G_{SL}$, $G_{SR}$ are less than a first predetermined value $G_{S1}$, the Hi map is selected as a threshold changing pattern as indicated in FIG. 4. If the decelerations $G_{SL}$, $G_{SR}$ are equal to or greater than predetermined value $G_{S1}$ but are less than a predetermined value $G_{S2}$, the Lo 3 map is selected. If the decelerations $G_{SL}$, $G_{SR}$ are equal to or greater than the second predetermined value $G_{S2}$ but are less than a third predetermined value $G_{S3}$, the Lo2 map is selected. If the decelerations $G_{SL}$, $G_{SR}$ are equal to or greater than the third predetermined value $G_{S3}$, the Lo1 map is selected. If a failure occurs in the satellite sensor 16, 18 or an abnormality occurs in communication between the satellite sensors 16, 18 and the ECU 12, the failsafe map is selected.

In the above-described construction, the activation control portion 40 supplies the drive signal from the input-output circuit 20 to the drive circuit 32 of the airbag apparatus 30 if comparison of the value determined from the relationship between the calculated value f(Gf) and the speed Vn with the threshold SH of the threshold changing pattern selected and set by the threshold setting portion 42 shows that the value determined from the relationship between the calculated value f(Gf) and the speed Vn is greater than the threshold SH. In this case, the airbag apparatus 30 is activated so as to deploy the airbag 36.

Thus, according to this embodiment, the threshold for activating the airbag apparatus 30 is changed in accordance with the impact given to on a forward portion of the vehicle body. Therefore, it is possible to execute a suitable control of the activation of the airbag apparatus 30 in accordance with the fashion of collision of the vehicle 10, such as a head-on collision, an offset collision, a diagonal collision, etc. Hence, the airbag apparatus 30 is more readily activated if a greater impact occurs on a forward portion of the vehicle body. Thus, the airbag apparatus 30 can be properly activated.

However, in the case of an offset collision, a diagonal collision or the like, the impacts received by left and right front portions of the vehicle body are greatly different from each other. In this embodiment, the satellite sensors 16, 18 are disposed on the left and right forward portions of the vehicle body as mentioned above. Therefore, if an offset collision or the like occurs in this embodiment, the satellite sensors 16, 18 produce output signals different from each other, so that a situation may be brought about in which the map selected as a threshold changing pattern through the use of the output signal of the satellite sensor 16 and the map selected as a threshold changing pattern through the use of the output signal of the satellite sensor 18 are different. Hence, in a construction having a plurality of satellite sensors 16, 18 in a forward portions of the body vehicle as in this embodiment, it is necessary to determine which one of the output signals of the satellite sensors 16, 18 should be used as a basis for changing the threshold changing pattern for activation of the airbag apparatus 30.

The system of this embodiment is characterized in that if the maps based on the output signals of the satellite sensors 16, 18 are different from each other, one of the output signals of the satellite sensors 16, 18 that indicates a greater impact is selected as a basis for changing the threshold changing pattern for activation of the airbag apparatus 30, that is, of the maps based on the output signals of the satellite sensors 16, 18, the map on the Lo1 map side is selected as a threshold changing pattern for activation of the airbag apparatus 30.

If one of the satellite sensors 16, 18 has a failure, it is impossible to set a threshold changing pattern by using the output signal of the failed sensor. In this case, however, the other sensor functions normally, so that a threshold changing pattern can be set by using the output signal of the normal sensor. Therefore, in order properly activate the airbag apparatus 30 under such a circumstance, it is appropriate to change the threshold changing pattern for activation of the airbag apparatus 30 based on the output signal of the sensor that does not have a failure. Hence, the system of the embodiment is characterized in that if one of the satellite sensors 16, 18 has a failure, the output signal of the sensor that normally functions is used to set a threshold changing pattern for activation of the airbag apparatus 30.

In this construction, however, if under a circumstance that one of the satellite sensors 16, 18 has a failure, a site of installation of the one of the satellite sensors 16, 18 that normally functions receives substantially no impact, the Hi map will be selected and set as a threshold changing pattern for activation of the airbag apparatus 30. The threshold changing pattern realized in that case is a threshold changing pattern that makes the airbag apparatus 30 least prone to be activated. Therefore, the airbag apparatus 30 does not become prone to be activated, even if a great impact occurs on the site of installation of the failed one of the satellite sensors 16, 18. Thus, an event that the airbag 36 is not properly deployed can occur.

If the ECU 12 detects a failure of either one of the satellite sensors 16, 18, the ECU 12 selects the failsafe map as a threshold changing pattern for the failed sensor. As mentioned above, the failsafe map partially overlaps the Lo3 map, which has a smaller threshold SH than the Hi map. Therefore, if one of the satellite sensors 16, 18 has a failure and the Hi map is selected and set as a threshold changing pattern by using the output signal of the sensor that normally functions, the selection of the failsafe map as a threshold changing pattern is more appropriate in view of proper deployment of the airbag 36. Therefore, the system of this embodiment is also characterized in that if one of the satellite sensors 16, 18 has a failure and the Hi map is selected and set by using the output signal of the sensor that normally functions, the failsafe map is selected and set as a threshold changing pattern for activation of the airbag apparatus 30.

Characteristic portions of the embodiment will be described hereinafter with reference to FIGS. 5 and 6. FIG. 5 indicates a map for setting a threshold changing pattern for activation of the airbag apparatus 30 based on a relationship between a map that is to be set based on the output signal of the satellite sensor 16 and a map that is to be set based on the output signal of the satellite sensor 18.

As shown in FIG. 5, if the map based on the output signal of the satellite sensor 16 disposed on the left side of a forward portion of the vehicle body is the same as the map based on the output signal of the satellite sensor 18 disposed on the right side of the forward portion of the vehicle body, the map is selected and set as a threshold changing pattern for activation of the airbag apparatus 30. Conversely, if the two maps are different from each other, the map of a smaller threshold SH is selected and set as a threshold changing pattern for activation of the airbag apparatus 30.

In this case, the map of a greater threshold SH, of the maps based on the satellite sensors 16, 18, is not set as a threshold changing pattern. Therefore, according to the embodiment, it is possible to avoid an event that the airbag apparatus 30 becomes less prone to be activated under a circumstance that there is a great impact on one of the right and left portions of the forward portion of the vehicle body. Hence, the embodiment reliably avoids an event that the airbag 36 is not deployed although there is a great impact on one of the right and left portions of the forward portion of the vehicle body, and makes it possible to properly activate the airbag apparatus 30.

Furthermore, if, under a circumstance that the failsafe map is selected due to a failure of one of the satellite sensors 16, 18, the map based on the output signal of the sensor that functions normally is one of the Lo1, Lo2 and Lo3 maps (hereinafter, these maps may be collectively termed "Lo map"), the Lo map is selected and set as a threshold changing pattern for activation of the airbag apparatus 30. Conversely, if under the aforementioned circumstance, the map based on the output signal of the sensor that normally functions is the Hi map, the failsafe map is selected and set as a threshold changing pattern for activation of the airbag apparatus 30.

That is, under a circumstance that one of the satellite sensors 16, 18 has a failure, the map of a smaller threshold SH is selected from the failsafe map and the map based on the sensor that normally functions, and is set as a threshold changing pattern. Therefore, according to the embodiment, if one of the satellite sensors 16, 18 has a failure, the Hi map is not selected as a threshold changing pattern, but a map that allows the airbag apparatus 30 to be properly activated is selected. Thus, according to the embodiment, it is possible to set the threshold changing pattern for activation of the airbag apparatus 30 to a proper value even if one of the satellite sensors 16, 18 has failed.

FIG. 6 is a flowchart illustrating a control routine executed by the ECU 12 in this embodiment in order to realize functions mentioned above. The routine illustrated in FIG. 6 is a routine repeatedly executed at every elapse of a predetermined time. When the routine illustrated in FIG. 6 starts, the processing of step 100 is first executed.

In step 100, it is determined whether the maps selected based on the output signals of the satellite sensors 16, 18 are one and the same map. If it is determined that the two maps are the same, the processing of step 102 is subsequently executed. Conversely, if it is determined that the two maps are not the same, the processing of step 104 is subsequently executed.

In step 102, a processing is executed in which after it is determined in step 100 that the two maps are one and the same map, the map is selected and set as a threshold changing pattern for determining whether to activate the airbag apparatus 30. If the processing of step 102 is executed, the threshold SH on the map is compared with a value determined from the relationship between the calculated value f(Gf) and the speed Vn from then on. Based on the result of comparison, the deployment of the airbag 36 is controlled. After the processing of step 102 ends, the present execution of the routine is ended.

In step 104, it is determined whether with regard to one of the satellite sensors 16, 18, the failsafe map has been selected due to a failure or the like of that sensor. If it is determined that the failsafe map has not been selected with regard to either one of the satellite sensors 16, 18, the processing of step 106 is subsequently executed. Conversely, if it is determined that the failsafe map has been selected with regard to one of the satellite sensors 16, 18, the processing of step 108 is subsequently executed.

In step 106, a processing is executed in which, of the two maps based on the output signals of the satellite sensors 16, 18, the map of a smaller threshold SH, that is, the map on the Lo1 map side, is selected as a threshold changing pattern. If the processing of step 106 is executed, the threshold changing pattern of the smaller threshold SH is compared with a value determined from the relationship between the calculated value f(Gf) and the speed Vn from then on. After the processing of step 106 ends, the present execution of the routine is ended.

In step 108, it is determined whether, under the circumstance that the failsafe map is selected with regard to one of the satellite sensors 16, 18, the map based on the output signal of the other one of the satellite sensors 16, 18 is the Hi map. Comparison between the failsafe map and the Hi map shows that the map having a smaller threshold SH is the failsafe map. Therefore, if the map based on the output signal of the normally functioning one of the satellite sensors 16, 18 is the Hi map, it is appropriate to select the failsafe map as a threshold changing pattern for activation of the airbag apparatus 30. Therefore, if determination is thus made, the processing of step 112 is subsequently executed.

Conversely, if the map based on the output signal of the normally functioning one of the satellite sensors 16, 18 is not the Hi map, that is, if the map is the Lo1 map, the Lo2 map or the Lo3 map, it is appropriate to select the Lo map as a threshold changing pattern for activation of the airbag apparatus 30 since comparison of the two maps tells that it is the Lo map that has a smaller threshold SH. Therefore, if determination is thus made, the processing of step 110 is subsequently executed.

In step 110, a processing is executed in which the Lo map based on the output signal of the normally functioning one of the satellite sensors 16, 18 is selected and set as a threshold changing pattern. If the processing of step 110 is executed, the threshold SH on the Lo map and a value determined from the relationship between the calculated value f(Gf) and the speed Vn are compared from then on. After the processing of step 110 ends, the present execution of the routine is ended.

In step 112, a processing is executed in which the failsafe map is selected and set as a threshold changing pattern. If the processing of step 112 is executed, the threshold SH on the failsafe map and a value determined from the calculated value f(Gf) and the speed Vn are compared from then on. After the processing of step 112 ends, the present execution of the routine is ended.

According to the above-described process, if the map selected as a threshold changing pattern based on the output signal of the satellite sensor 16 and the map selected as a threshold changing pattern based on the output signal of the satellite sensor 18 are different from each other, one of the two maps that has a smaller threshold SH can be selected and set as a threshold changing pattern. Therefore, according to the embodiment, it is possible to avoid an event that the airbag apparatus 30 becomes less prone to be activated under a circumstance that there is a great impact on one of right and left portions of a forward portion of the vehicle body. Hence, the embodiment makes it possible to properly make determination for activation of the airbag apparatus 30.

Furthermore, according to the above-described process, if under a circumstance that one of the satellite sensors 16, 18 has a failure, the map selected as a threshold changing pattern based on the normally functioning sensor is a Lo map, the Lo map can be selected and set as a threshold changing pattern. If under the aforementioned circumstance, the map selected based on the normally functioning map is the Hi map, the failsafe map can be selected and set as a threshold changing pattern.

The failsafe map partially overlaps the Lo3 map as mentioned above. That is, if one of the satellite sensors 16, 18 has a failure in the embodiment, the map of a smaller threshold SH of the failsafe map and the map based on the normally functioning sensor can be selected and set as a threshold changing pattern.

Therefore, according to the embodiment, if one of the satellite sensors 16, 18 has a failure, it is possible to avoid an event that the airbag apparatus 30 becomes less prone to be activated and also to avoid an event that the airbag apparatus 30 becomes prone to be activated when not necessary. Therefore, according to the embodiment, even if one of the satellite sensors 16, 18 has a failure, the threshold changing pattern for activation of the airbag apparatus 30 can be set to a proper value. Hence, it is possible to properly make determination for activating the airbag apparatus 30.

In the foregoing embodiment, the two satellite sensors 16, 18 are disposed in a forward portion of the vehicle body. If the maps based on the output signals of the two sensors are different from each other, the map of a smaller threshold SH is selected as a threshold changing pattern. In this manner, the determination for activating the airbag apparatus 30 is property performed. However, it is also possible to apply the embodiment to a construction in which at least three satellite sensors are disposed, and the map of the least threshold SH among the maps based on the three sensors is selected as a threshold changing pattern.

As mentioned above, even if the thresholds that can be separately set based on the output signals of a plurality of second sensors are different from one another, it is possible to set a proper value of the threshold.

Furthermore, even if at least one of the second sensors has a failure, it is possible to set the threshold for activation of the airbag apparatus to a proper value.

Satellite sensors 16, 18 that output level signals corresponding to an impact on a vehicle 10 are provided right and left portions of a forward portion of the vehicle 10, separately from a floor sensor 14. If a map Lo1, Lo2, Lo3, Hi selected as a threshold changing pattern from an impact (deceleration) detected based on the output signal of one of the satellite sensors 16, 18 and a map Lo1, Lo2, Lo3, Hi selected as a threshold changing pattern from an impact (deceleration) detected based on the output signal of the other satellite sensor are different from each other, the map of a smaller threshold is selected from the maps based on the output signals of the two satellite sensors 16, 18, and is set as a threshold changing pattern for determining whether to activate an airbag apparatus 30.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An airbag apparatus activation control apparatus comprising:
    a first sensor that is disposed at a predetermined position in a vehicle and that outputs a signal corresponding to an impact that occurs on the vehicle;
    activation control means for activating an airbag apparatus if a parameter value based on the signal outputted by the first sensor exceeds a predetermined threshold;
    a plurality of second sensors each of which is disposed at a position in the vehicle that is different from a position of the first sensor and each of which outputs a signal corresponding to an impact that occurs on a site in the vehicle related to the sensor; and
    threshold changing means for changing the predetermined threshold in accordance with signals outputted by the plurality of said second sensors on the basis of a threshold reduction map, wherein
    the threshold changing means sets a failsafe predetermined value, if at least one of the plurality of second sensors has a failure, and sets the predetermined threshold to the failsafe predetermined value when the predetermined threshold based on the signal from the at least one second sensor that does not have a failure is greater than the failsafe predetermined value.

2. The airbag apparatus activation control apparatus according to claim 1, wherein
    said threshold changing means changes the predetermined threshold in accordance with a signal that indicates a greatest impact among signals outputted by the plurality of said second sensors.

3. The airbag apparatus activation control apparatus according to claim 1, wherein
    if at least one of the plurality of second sensors has a failure, said threshold changing means changes the predetermined threshold in accordance with the signal outputted by at least one second sensor that does not have a failure.

4. The airbag apparatus activation control apparatus according to claim 1, wherein
    a value outputted by the second sensors is a deceleration of the vehicle or a value obtained by integrating the deceleration with respect to a unit time.

5. The airbag apparatus activation control apparatus according claim 1, wherein
    the plurality of second sensors are disposed forward of the first sensor within the vehicle.

6. An airbag apparatus activation control method for activating an airbag apparatus if a parameter value based on a signal corresponding to an impact that occurs on a vehicle exceeds a predetermined threshold, comprising the steps of:
    setting a threshold;
    detecting an impact that occurs on the vehicle via a first sensor, and setting a parameter value based on a signal outputted by the first sensor in accordance with the impact;
    detecting an impact that occurs on the vehicle via a plurality of second sensors that are disposed at positions in the vehicle different from a position of the first sensor, and changing the predetermined threshold in accordance with signals outputted by the plurality of said second sensors on the basis of a threshold reduction map; and activating the airbag apparatus if the parameter value exceeds the threshold, wherein if at least one of the plurality of second sensors has a failure, a failsafe predetermined value is set and the predetermined threshold is set to the failsafe predetermined value when the predetermined threshold based on the signal from the at least one second sensor that does not have a failure is greater than the failsafe predetermined value.

7. The airbag apparatus activation control method for activating an airbag apparatus according to claim 6, wherein said threshold is changed in accordance with a signal that indicates a greatest impact among signals outputted by the second sensors.

8. The airbag apparatus activation control method for activating an airbag apparatus according claim 6, wherein if at least one of the plurality of second sensors has a failure, said threshold is changed in accordance with a signal outputted by a second sensor that does not have a failure.

* * * * *